United States Patent
Wright et al.

(10) Patent No.: US 12,333,074 B2
(45) Date of Patent: Jun. 17, 2025

(54) SYSTEMS FOR CONTROLLING ONE OR MORE DEVICES USING A SIGNAL CONTROL UNIT

(71) Applicant: Synchron Australia Pty Limited, Dover, DE (US)

(72) Inventors: Jason Wright, Dover, DE (US); Thomas James Oxley, Dover, DE (US); Swagata Riki Banerjee, Dover, DE (US); Evan Schnell, Dover, DE (US); Carl Wahlstrand, Dover, DE (US); Darragh McDermott, Dover, DE (US); James Bennett, Dover, DE (US); Peter Eli Yoo, Dover, DE (US)

(73) Assignee: Synchron Australia Pty Limited, Dover, DE (US)

( * ) Notice: Subject to any disclaimer, the term of this patent is extended or adjusted under 35 U.S.C. 154(b) by 0 days.

(21) Appl. No.: 18/882,591

(22) Filed: Sep. 11, 2024

(65) Prior Publication Data
US 2025/0085779 A1    Mar. 13, 2025

Related U.S. Application Data

(60) Provisional application No. 63/676,350, filed on Jul. 27, 2024, provisional application No. 63/581,967, filed on Sep. 11, 2023.

(51) Int. Cl.
G06F 3/01    (2006.01)
G06F 1/26    (2006.01)

(52) U.S. Cl.
CPC ............. *G06F 3/015* (2013.01); *G06F 1/26* (2013.01); *G06F 3/017* (2013.01)

(58) Field of Classification Search
CPC ............. G06F 3/015; G06F 1/26; G06F 3/017
USPC ..................................... 340/286.01
See application file for complete search history.

(56) References Cited

U.S. PATENT DOCUMENTS

| | | |
|---|---|---|
| 10,485,968 B2 | 11/2019 | Opie et al. |
| 10,512,555 B2 | 12/2019 | John et al. |
| 10,575,783 B2 | 3/2020 | Oxley |
| 10,729,530 B2 | 8/2020 | Opie et al. |
| 2014/0169795 A1 | 6/2014 | Clough |
| 2016/0216768 A1* | 7/2016 | Goetz ................. A61B 18/14 |
| 2017/0108926 A1 | 4/2017 | Moon et al. |
| 2018/0303595 A1 | 10/2018 | Opie et al. |
| 2019/0038438 A1 | 2/2019 | John et al. |
| 2019/0336748 A1 | 11/2019 | Oxley |
| 2019/0358445 A1 | 11/2019 | Opie et al. |
| 2020/0016396 A1 | 1/2020 | Yoo |
| 2020/0078195 A1 | 3/2020 | John et al. |
| 2020/0352697 A1 | 11/2020 | Opie et al. |
| 2020/0363869 A1 | 11/2020 | Yoo |

(Continued)

FOREIGN PATENT DOCUMENTS

| | | |
|---|---|---|
| WO | WO 2021/092462 | 5/2021 |
| WO | WO 2021/097448 | 5/2021 |

(Continued)

*Primary Examiner* — Omar Casillashernandez
(74) *Attorney, Agent, or Firm* — Levine Bagade Han LLP

(57) ABSTRACT

Interface systems for directing communication between an individual and a plurality of external devices using an external system control unit, where the individual has a neural interface device having an electrode component electrically coupled with a transmitter/receiver component.

26 Claims, 7 Drawing Sheets

(56) References Cited

U.S. PATENT DOCUMENTS

| | | | |
|---|---|---|---|
| 2021/0137542 A1 | 5/2021 | Oxley et al. | |
| 2021/0267523 A1 | 9/2021 | Donoghue et al. | |
| 2021/0299353 A1* | 9/2021 | Mannu | A61M 5/1723 |
| 2022/0184403 A1* | 6/2022 | Chouinard | A61N 1/36082 |
| 2024/0404428 A1 | 12/2024 | Gangjee et al. | |
| 2025/0041592 A1 | 2/2025 | Opie et al. | |

FOREIGN PATENT DOCUMENTS

| | | |
|---|---|---|
| WO | WO 2021/237203 | 11/2021 |
| WO | WO 2023/031066 | 3/2023 |

* cited by examiner

SYSTEMS FOR CONTROLLING ONE OR MORE DEVICES USING A SIGNAL CONTROL UNIT

RELATED APPLICATIONS

This application is a non-provisional of U.S. provisional application Nos. 63/581,967 filed Sep. 11, 2023, and 63/676,350 filed Jul. 27, 2024. The entirety of both of which are incorporated by reference.

BACKGROUND

The development of brain-computer-interface ("BCI") technologies presently focuses both on safety and enabling people living with full or partial paralysis or with limited/decreasing motor ability to use a BCI system to control electronic devices, including prosthetic arms and computers and to complete a variety of daily tasks. There is a need to restore continuous and independent motor outputs that allow for BCI control of devices by the BCI user. BCI systems hold promise for restoring lost neurologic function, including motor neuroprostheses (MNPs), to restore motor capability to the individual. An implantable MNP can directly infer motor intent by detecting local brain signals and transmitting the motor control signal out of the brain to generate a motor output, referred to as a digital motor output (DMO), and subsequently control computer actions or control other electronic devices. In one variation, this physiological function can be performed by the motor neurons in the individual.

However, while traditional BCI systems provide a paralyzed patient with some level of autonomy through control of the device, the BCI systems that exist today afford only very limited overall autonomy to patients with paralysis. For example, a paralyzed individual using a BCI system typically requires assistance with setting up or turning on the BCI system (including charging/recharging), calibrating the system for an individual's use, including learning how an individual must think so to enable useful electronic commands to be generated; and setting up the individual (adjusting the screens, antennas and/or posture etc. of the patient) to allow the individual to use the system (as opposed to setting up the system itself).

Conventional BCI systems function by connecting with a computing device, such as a computer or tablet. These conventional systems do not enable an individual with limited peripheral mobility to autonomously switch between using a variety of devices. There is a need for individuals with limited peripheral mobility to autonomously control a variety of independent devices at will, both concurrently and to be able to select which devices are controlled at any given time.

There is also a need for a BCI system that provides BCI users with more meaningful autonomy and independence. Such meaningful autonomy and independence can be provided by a BCI system used by an individual that requires less assistance from or even in the absence of a caregiver. Moreover, there remains a need for a BCI system that can communicate with one or more external devices through a central processing system that can serve various functions to increase the ability of the patient to interact with a host device as well as to allow caregivers to monitor and/or service the BCI as needed.

SUMMARY

The systems and methods described herein allow for a BCI system that can always be available, enabling the BCI user to access digital devices. This system improves the quality of life of the BCI user by providing independence in daily living activities by autonomously accessing digital devices or sending a remote call-for-help when they are alone. This critical architecture decision defines a fully implanted recording component and a portable SCU while also setting some critical constraints that further elaborate the system design.

While variations of the systems and methods include BCI users who are fully or partially paralyzed or have limited/decreased motor ability, additional variations include any user that could benefit from the systems and methods. For example, such a user could include an individual having motor capabilities but is expected to lose those capabilities due to a chronic condition. Moreover, variations of the systems and methods described herein are used with one or more neuroprostheses with fully implanted recording components. However, additional methods and systems described herein can include partially implanted recording components or external recording components.

Variations of the present disclosure include an interface system for use by an individual, the interface system including: a neural interface device having an electrode component electrically coupled with a transmitter/receiver component, where the electrode component is configured to detect a brain signal from a brain of the individual and the transmitter/receiver component is configured to transmit an electronic signal representative of the brain signal; a signal control unit including a housing structure that is physically separate from the neural interface device and is configured to be portable; a power supply, an electronic communications circuitry and a processor each housed with the housing structure; wherein the processor is configured to apply one or more algorithms to decode the electronic signal from the transmitter/receiver component and is also configured to produce an output signal upon determining that the electronic signal is representative of an intentional neural brain signal generated by the individual; and wherein the electronic communications circuitry is configured to provide a plurality of wireless electronic communication modalities for electronic transfer communication of the output signal to a plurality of external devices, wherein at least two wireless electronic communication modalities are different and wherein the electronic communications circuitry is also configured for electronic exchange of a device data with one or more of the plurality of external devices, where the device data is generated by at least one of the plurality of external devices.

Additional variations of the system include a signal control unit including a housing structure that is physically separate from the neural interface device and is configured to be portable; a power supply, an electronic communications circuitry and a processor each housed with the housing structure; wherein the processor is configured to apply one or more algorithms to decode the electronic signal from the transmitter/receiver component and is also configured to produce an output signal upon determining that the electronic signal is representative of an intentional neural brain signal generated by the individual; and wherein the electronic communications circuitry is configured to provide a plurality of wireless electronic communication modalities for electronic transfer communication of the output signal to a plurality of external devices, wherein at least two wireless electronic communication modalities are different and wherein the electronic communications circuitry is also configured for electronic exchange of a device data with one or more of the plurality of external devices, where the device data is generated by at least one of the plurality of external devices.

Electrically coupling can include the ability of any device to transmit and/or receive a signal in an electronic form using any means of data transfer. Such transfer includes wireless electronic connections or receipts. Such transfer can also include wired connections. The communication modalities can include, but are not limited to, short-range wireless (e.g., blue tooth or blue tooth low energy), ultra-high frequency (such as low power device 433 MHz), as well as the ability to communicate via an HTTP/HTTPS using a WIFI or other network connection. Such electrical coupling can include two-way coupling, where data/signal is sent and received, or one-way coupling, where data/signal is sent by one device with no receipt of data/signal returned back to the device. Moreover, for purposes of this disclosure, in the variations discussed below, the term can be interchangeably used with signal when discussion electronic communication between or from any device.

Variations of the present disclosure include an interface system, wherein at least one of the plurality of wireless electronic communication modalities includes a security communication modality and where only a subset of the plurality of external devices includes the security communication modality. In one example, such a security communication modality can include a wireless communication modality that uses a proprietary connection, encryption, or other specialization that prevents the signal/data from being received by non-authorized external devices. In one variation, the security communication modality can comprise a proprietary and/or encrypted BLE.

In some variations of the interface system, the transmitter/receiver component of the neural interface device and the signal control unit are configured to use the security communication modality to communicate the electronic signal representative of the brain signal. For example, such a configuration allows a user to limit/prevent the dissemination of data/signals to unauthorized devices. In an example of the present system, such a subset of external devices includes a host device (primarily used by the BCI user) and/or an administrator device (primarily used by a caregiver or system technician) to monitor operations of and/or maintain the system.

In some variations, the signal control unit is configured for wirelessly coupling to a host device having one or more applications that control at least one of the plurality of external devices. The signal control unit can be configured to directly wirelessly exchange data with the host device. Alternatively, or in combination, the signal control unit can in-directly wirelessly exchange data with the host device.

In some variations, the signal control unit is configured to communicate the output signal with one of the plurality of external devices at a time. Alternative variations of the system can allow the signal control unit to communicate simultaneously with any number of devices.

Variations of the present disclosure include an interface system, wherein the neural interface device is coupled to the transmitter/receiver component through one or more lead members. In some examples, the neural interface device, the one or more lead members, and the transmitter/receiver component are configured for full implantation within the individual. Alternatively, the neural interface can be partially implanted (e.g., portions of the system extend outside of the body), can be fully external (e.g., external electrodes), or a combination thereof.

Variations of the interface system include a transmitter/receiver component that is configured for wireless charging of a power supply in the transmitter/receiver component and independently of the signal control unit using a remote charging device. Optionally, the transmitter/receiver component and the remote charging device can maintain a wireless communication connection therebetween during charging or simply when connected.

Variations of the present disclosure include an interface system, wherein the signal control unit is configured to electronically connect with one or more of the plurality of external devices and retain the information needed to re-connect if any external device is disconnected.

Variations of the present disclosure include a signal control unit that is further configured to detect whether the one or more of the plurality of external devices and to alter the output signal based on whether the one or more of the plurality of external devices is electrically connected to the signal control unit.

The signal control unit can be configured to transmit the output signal as a wireless signal to an alert device when the plurality of external devices are unconnected to the signal control unit.

The signal control unit can include a user interface accessible on a surface of the housing structure, where the user interface includes a plurality of visible indicators.

Variations of the present disclosure include an interface system, wherein the signal control unit is configured to indirectly exchange data with the host device using a network connection.

Variations of the present disclosure include an interface system, wherein the signal control unit is configured to transmit a system-generated output signal automatically without prompting by the individual.

Variations of the present disclosure include an interface system, wherein the plurality of external devices includes a first external device and a second external device, and wherein the signal control unit is configured to wirelessly transmit the device data from the first external device to the second external device.

Variations of the present disclosure include an interface system, wherein the signal control unit is configured to establish a wireless network connection with a cloud-based network.

Variations of the present disclosure include an interface system, wherein the signal control unit is configured to determine whether at least one of the plurality of external devices uses a gesture control and wherein the signal control unit adjusts the output signal to trigger the gesture control.

The present disclosure also includes methods of operatively interfacing an individual with a plurality of external devices. For example, such a method can include detecting a brain signal from the individual using a neural interface device having an electrode component electrically coupled with a transmitter/receiver component; transmitting an electronic signal representative of the brain signal using the transmitter/receiver component to a signal control unit including a housing structure that is physically separate from the neural interface device and is configured to be portable; processing the electronic signal representative of the brain signal using a processor within the signal control unit that is configured to apply one or more algorithms to decode the electronic signal from the transmitter/receiver component; producing an output signal upon determining that the electronic signal is representative of an intentional neural brain signal generated by the individual; transmitting the output signal to one or more external devices using the signal control unit; and electronically exchanging a device data with one or more of the plurality of external devices using the signal control unit, where the device data is generated by at least one of the plurality of external devices, where the signal control unit is configured to select a plurality of separate communication modalities based on which of the plurality of external devices is connected to the signal control unit.

Variations of method can include electronically exchanging the device data with one or more of the plurality of external devices using the signal control unit, where the device data is generated by at least one of the plurality of external devices.

In additional variations, the present disclosure includes systems for transmitting an electronic signal to an external device from an individual having an electrode device configured to receive brain signals from a brain of the individual and a receiver and transmitter unit, electrically coupled to the electrode device, the receiver and transmitter unit configured to receive an electronic neural signal from the electrode device corresponding to brain signals from the brain of the individual, the system including: a signal control unit configured to receive transmissions from the receiver and transmitter unit, the signal control unit configured to perform signal processing on the electronic neural signal to produce at least one output signal; and a first external host device configured to electronically communicate with the signal control unit.

Variations of systems can further include a second external device, where the signal control unit is configured to electronically communicate with both the first external host device and the second external device. Optionally, the first external host device is a patient host device and the second external device is a monitoring device. Either the first external host device or the second external device can initiate communication with the signal control unit.

DETAILED DESCRIPTION

Figure 1A:
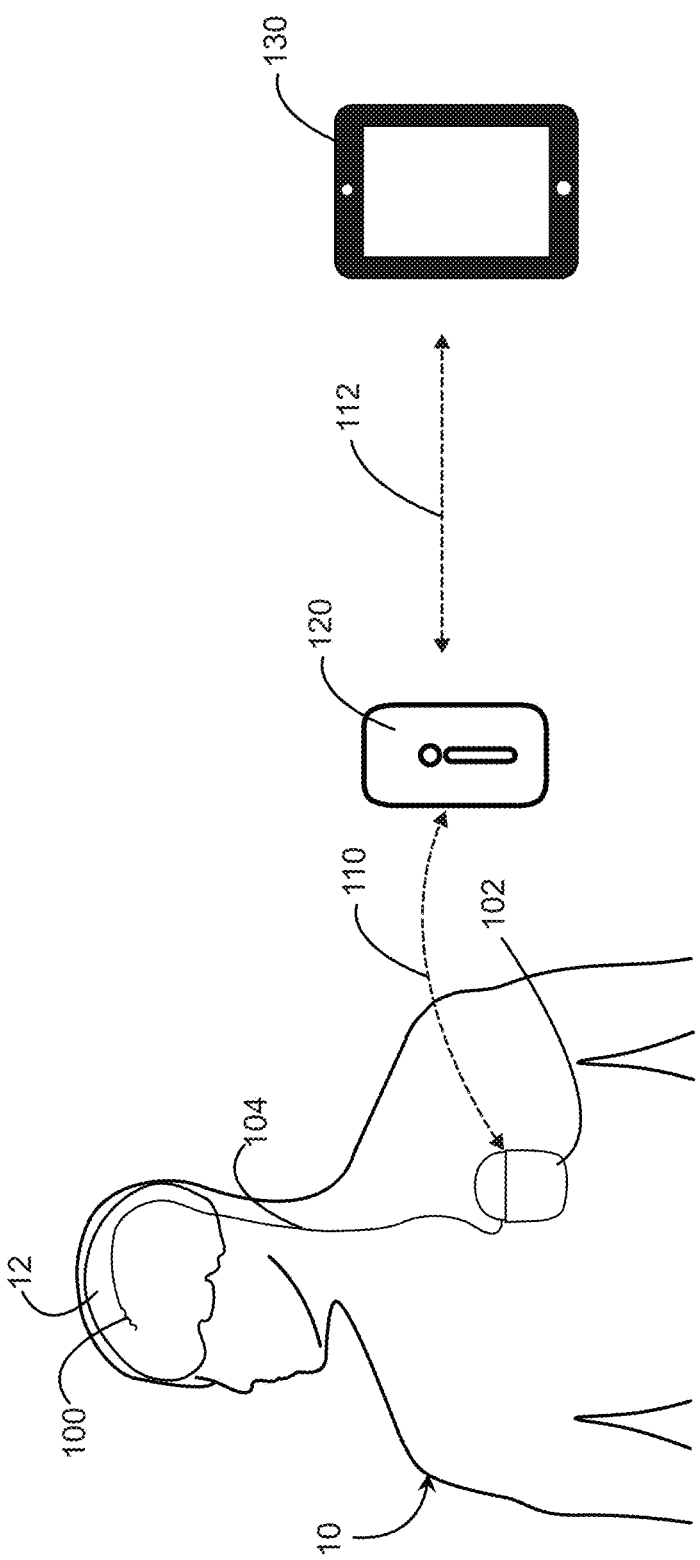
FIG. 1A illustrates a conventional approach to accessing regions of the brain with a brain stimulation device containing electrodes that are implanted within the brain of an individual.

FIG. 1A is a representative illustration of a brain controller interface comprising an implant 100 positioned within a brain 12 of an individual. The implant 100 can be coupled to a receiver and transmitter unit 102, where the receiver and transmitter unit produce an electronic neural signal from the electrode device corresponding to brain signals from the brain of the individual. Typically, the implant 100 is coupled to the receiver and transmitter unit 102 via one or more leads 104. However, this communication can occur wirelessly. Moreover, the systems described herein can be used with various other implantable and non-implantable external devices. In addition, the receiver and transmitter unit 102 can comprise an implantable housing where charging is performed through a capacitive or similar configuration from an external charging unit. Alternate variations include a receiver and transmitter unit 102 that is external to the individual 10.

FIG. 1A also shows the receiver and transmitter unit 102 having an ability to communicate with a signal control unit 120 that receives transmissions from the receiver and transmitter unit 102 and is configured to perform signal processing on the electronic neural signal to perform any number of functions for interaction with a host device 130 or a number of host devices. A host device can comprise any electronic device such as a computer or tablet, including dedicated and may also include non-dedicated (proprietary and/or non-proprietary) applications. The host device can support secure and proprietary communication with the signal control unit 120 and can provide a user interface for the individual BCI user. In some variations, individuals use the host device 130 to control a wide variety of applications, including.

This signal processing can include filtering, classifying, decoding, and transmitting the data received from the receiver and transmitter unit. In one variation, the inventive system simply comprises a signal control unit 120 and one or more external host devices 130, in which case the signal control unit 120 operates with a variety of systems. One benefit of using a dedicated signal control unit 120 is to provide a signal control unit 120 that allows for a power efficient low latency device for interaction with one or more electronic devices. In addition, the majority of the signal processing and data storage can occur in the signal control unit 120. The signal control unit 120 can be dedicated to signal processing and decision-making with custom applications to guide user interactions. In additional variations, the signal control unit 120 is configured to access a cloud-network 150 for computing and storage resources or for analytics. Offsetting such requirements from the implantable components allows for minimization of the weight and size of the transmitter unit 120 and reduces the heat generated by the transmitter unit 102 during operation.

In addition, moving all or most of the computing power to the signal control unit 120 allows any software updates to take place outside of the BCI user's body. In addition, this configuration allows the receiver and transmitter unit 102 to operate with lower power requirements to reduce the frequency of recharging. In alternate variations, the processing, storage, and communication functions can be divided between the receiver and transmitter unit 102, the signal control unit 120, and/or any external devices 130.

Generally, BCI system (the implant 100 and receiver and transmitter unit 102) captures motor intention from the brain (e.g., the motor cortex) and produces one or more electrical signals corresponding to the motor intention. Electrical signals can be captured from brain activity in regions other than the motor cortex. The signal control unit 120 decodes the electrical signals for utilization with a host device 130 for control of software applications (typically on the host device 130). In some cases, the host device 130 can be used to control additional digital devices (such as a computer, wheelchair, home automation systems, or other devices) that aid the individual 10 using the BCI.

Figure 1B:
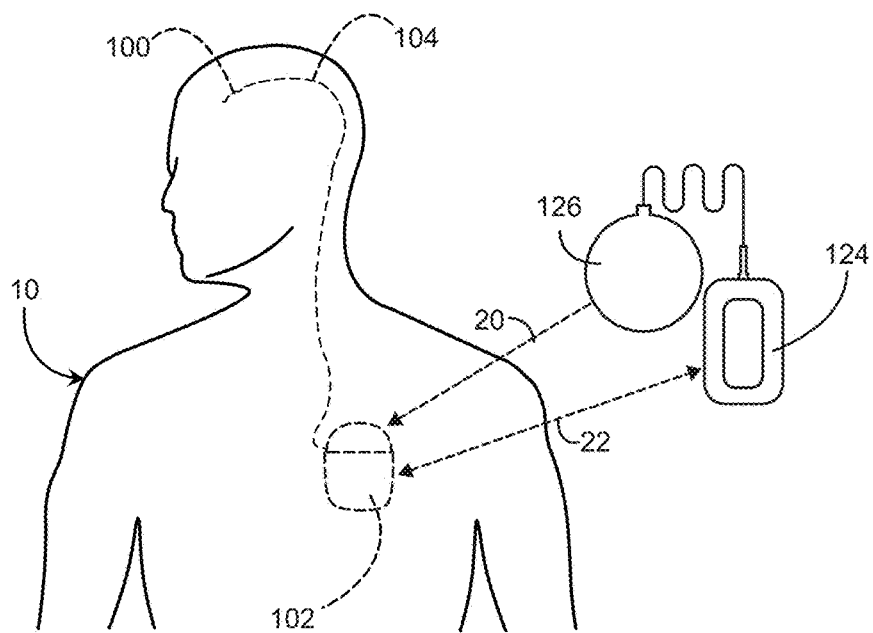
FIG. 1B shows a remote power supply that can be used to wirelessly charge and/or communicate with an implantable receiver and transmitter unit.

Variations of the systems and methods described herein include a benefit of increasing longevity of the implanted components (e.g., 100, 104, 102) of the system to avoid repeated surgeries to replace implanted components. Accordingly, variations of the system and methods allow for a receiver and transmitter unit 102 that can be remotely and/or wirelessly recharged 20 (e.g., capacitively) using an external power supply 124, 126 as represented in FIG. 1B. Alternative variations can include a receiver and transmitter unit 102 that allows for a physical connection to an external power supply.

In order to extend the longevity of the system as well as to increase mobility and autonomy of the BCI user 10, the systems and methods described herein can employ an architecture that distributes processing and data storage capabilities across non-implanted components of the system, with the implanted receiver and transmitter unit 102 responsible for obtaining and transmitting a signal indicative of the intent of the user. For example, the receiver and transmitter unit 102 can communicate with the electrode 100 such that when the electrode detects a brain signal from a brain of the BCI user 10, the receiver and transmitter unit is configured to transmit an electronic signal representative of the brain signal.

Figure 1C:
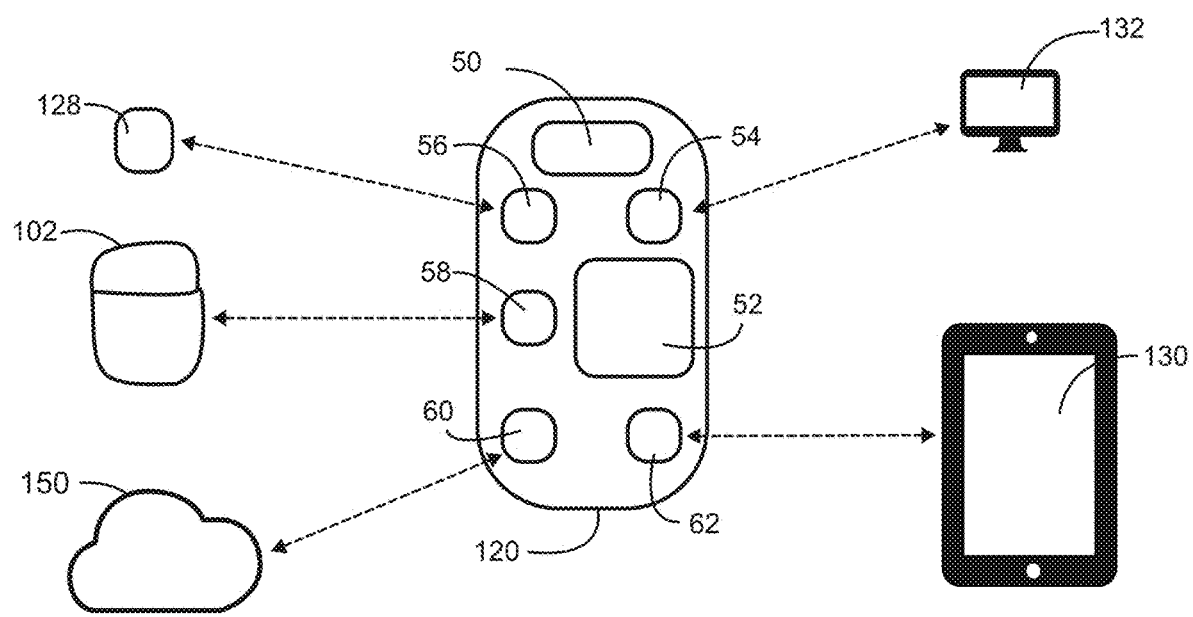
FIG. 1C illustrates a variation of a signal control unit that houses a power supply, processor, and circuitry to enable wireless and/or wired electronic communication.

FIG. 1C illustrates a variation of a signal control unit 120 that houses a power supply 50, processor 52, and circuitry 54-62 to enable wireless and/or wired electronic communication. The power supply 50 can comprise batteries or an external power source. The processor 52 is configured to apply one or more algorithms to decode the electronic signal from the transmission component. The signal control unit 120 can also be configured to produce an output signal upon determining that the electronic signal is representative of an intentional neural brain signal generated by the individual. Accordingly, the signal control unit 120 can house any number of communications circuitry or modules 54, 56, 58, 60, and 62 that can be used to electronically communicate with one or more external devices as discussed below. The modules can provide the signal control unit 120 with wireless or wired communication capabilities. Examples of wireless communication includes, but are not limited to, short-range wireless (e.g., blue tooth or blue tooth low energy), ultra-high frequency (such as low power device 433 MHZ), as well as the ability to communicate via an HTTP/HTTPS using a WIFI or other network connection. In the variation illustrated in FIG. 1C, the signal control unit 120 can include one or more blue tooth low energy (BLE) modules to simultaneously or sequentially communicate with the receiver and transmitter unit 120 as well as any number of external devices 130, 132. The signal control unit 120 can also include different modules to simultaneously communicate with an alert device 128. Although not shown, the signal control unit 120 can include one or more speakers or alarms to play a tone, series of tones, pre-recorded message, or other audible message/sound.

In one variation of the system, the system is configured such that the signal control unit 120 is configured to interact with the receiver and transmitter unit 102 using a specific communication mode to limit distribution of data from the receiver and transmitter unit 102. Such a specific communication mode can be encrypted, secured, and/or otherwise proprietary. This prevents transmission of data from the receiver and transmitter unit 102 to unauthorized devices. In some variations of the system, a host device is configured to receive data using this specific communication mode from the signal control unit 120. Therefore, one distinction between a host device 130 and other external devices 132 is that the external devices receive data using standard communication modes. In one variation of the system, the specific communication mode can comprise a proprietary and/or encrypted BLE, while communication with other external devices relies on other communication modes. This allows the signal control unit 120 to isolate/control various other communication modes to prevent inadvertent output of data (e.g., to prevent data transmitted unintentionally over the internet or to an external device).

In an additional variation of the system, the signal control unit 120 receives an electronic signal from the receiver and transmitter unit 102 and produces a decoded output signal. The signal control unit 120 is aware of which external devices are connected and active. Based on this information, the signal control unit 120 can produce an output signal for an HID. This HID output signal can be sent to the currently active end device. In one variation of the system, the signal control unit 120 more than external device can be connected to the signal control unit 120 but the signal control unit 120 is configured to only send the output signal to one device at a time. While the end devices can be paired in the host device 130 (e.g., by a caregiver), the user can control which device is active using neural signals. Additionally, during the active HID session with the end device, another active session with the host device can be ongoing using a distinct wireless protocol, which allows for secure input/output to/from the signal control unit 120 to the host device that informs the configuration and control of the signal control unit 120. Additionally, or alternatively, a third "proto-profile" or distinct wireless signal based on a third wireless protocol may utilize input and output signals communicating with the operating system of the host device (e.g. iOS Switch Control or Assistive Touch) to allow the patient to control the desktop and any apps on the host device or an "end" device instead of the host device based on context data from the host device. By utilizing a plurality of distinct wireless profiles (protocols or modes), the signal control unit 120 can communicate adaptively with a plurality of connected devices based on the decoded signal and the connected devices with which the signal control unit 120 is communicating.

Figure 1D:
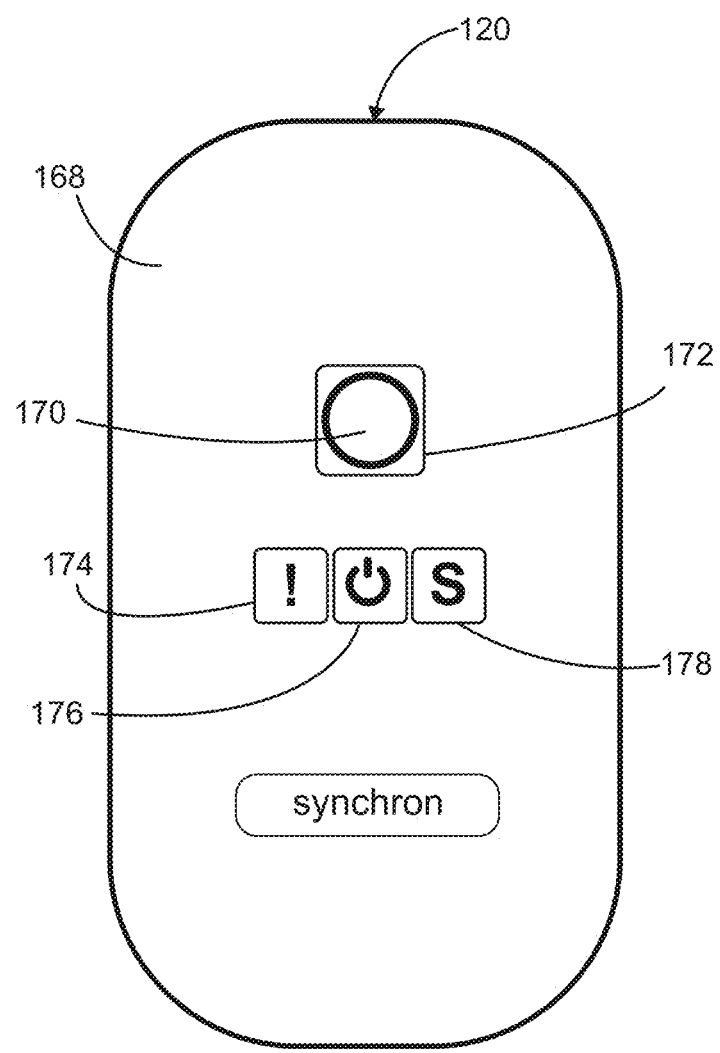
FIG. 1D illustrates an example of a portable signal control unit having a housing with a user interface on the housing.

FIG. 1D illustrates an example of a portable signal control unit 120 having a housing 168 with a minimal user interface on the housing to enable a lower power design as described herein. The housing 168 is selected to be portable (e.g., it can fit within the pocket of a garment or can be worn by the individual). The user interface shown in FIG. 1D uses auditory, vibratory, and/or light feedback to provide user information. The housing 168 includes a power button 170 that can also toggle the signal control unit 120 between a locked and unlocked configuration as well as a sleep/low power mode. The power button 170 can be elastomeric or capacitive. The region 172 around the power button can provide general information. In the illustrated example, the information region 172 shows a ring-shaped light indicator to convey certain functions of the signal control unit 120. This light can vary in size and color and can pulsate to use varying frequencies of appearance to convey information. The housing 168 can also include a notification indicator 174 that can be used to call attention to system information such as errors or other notifications. The housing 168 can also include a power indicator 176 to show the power level/state of charge. Additionally, the housing 168 can include a connectivity indicator to convey the status of the signal control unit 120 connection with the receiver and transmitter unit or other component of the system. Variations of the signal control unit 120 can include any combination of the indicators described above. Moreover, in additional variations, the signal control unit 120 can include a detailed user interface rather than a limited user interface. Although not illustrated, the signal control unit 120 can include any additional ports, recovery buttons, speakers, etc.

The limited user-interface with portable/small volume pocketable hardware provides a prosthetic hardware and functions to replace at least some lost mobility and function of the peripheral nervous system for the BCI user. To reduce power usage between user interactions host and end devices, the signal control unit 120 can be configured to disconnect any external device (e.g., host and/or external device) to save power when the receiver and transmitter unit 102 are in an idle mode. The signal control unit 120 can further leverage automation, or shortcuts, upon connection, to open the host device upon request of the signal control unit 120. The ability to monitor connected devices and selectively engage various communication modes can allow a signal control unit 120 to provide a BCI function for the user over a duration of at least 4, 8, 12, 24 hours on single battery charge, during which time the signal control unit 120 can receive, decode, and transmit distinct output signals to a plurality of external devices without external power.

Figure 1E:
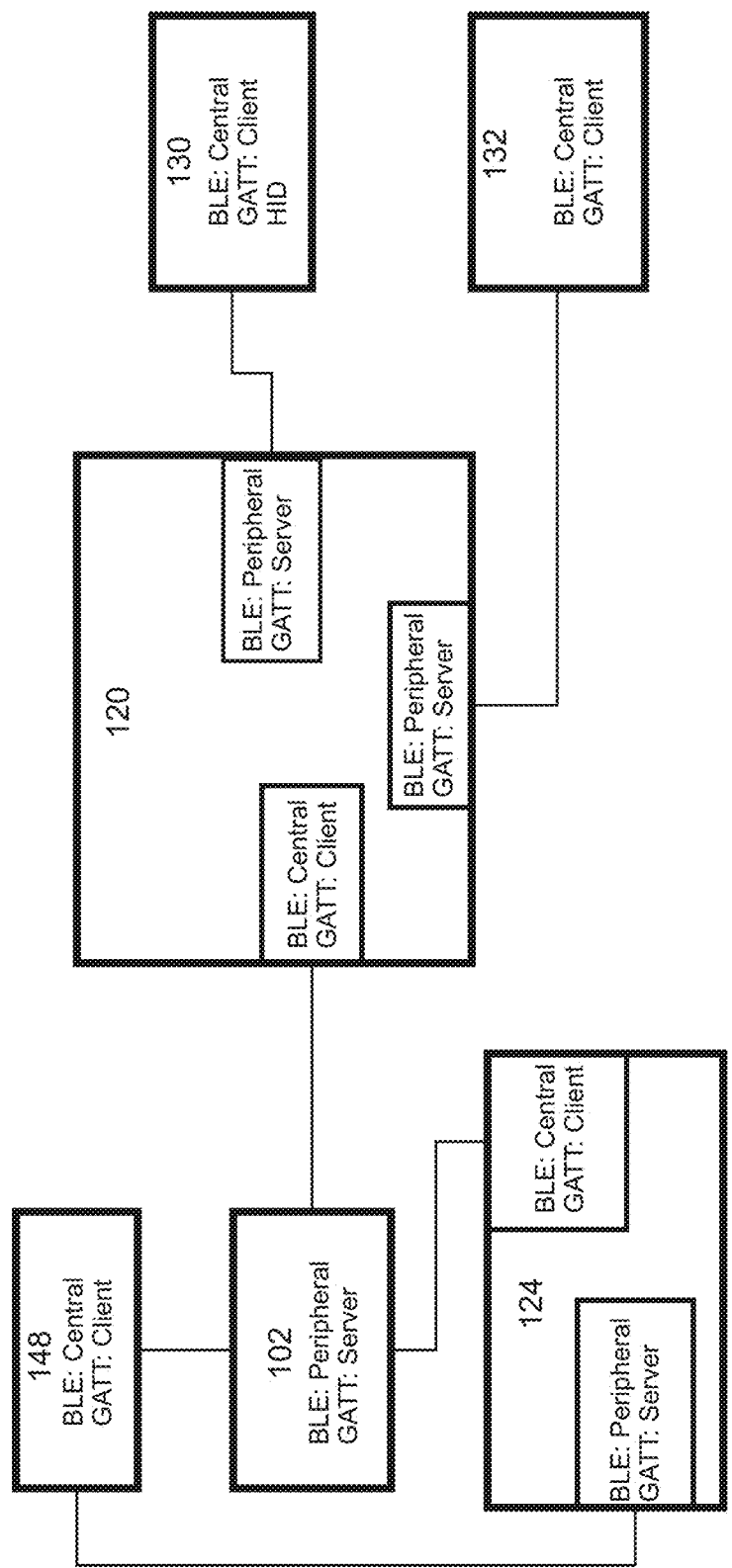
FIG. 1E shows a representation of an example of bonds or bonding between the various components of the BCI system.

FIG. 1E shows a representation of an examples of bonds between the various components of the BCI system. As shown, the receiver and transmitter unit 102 stores bonds for one signal control unit 120, one setup administrator device 148, and a charging device 124. As shown, the administrator device 148 can communicate with the receiver and transmitter 102 and/or the charging device 124 independently of the signal control unit. The system can be configured such that if a different instance of one of these elements connects, the prior instance's bond is cleared. In this variation, the receiver and transmitter unit 102 cannot connect to an administrator device 148 and a signal control unit 120 at the same time. The administrator device, like the host device, can be configured to communicate with the receiver and transmitter unit and/or signal control unit 120 using a specific communication mode discussed above.

The signal control unit 120 can act as a hub within the system such that it is optionally bonded with 0 to any number of end devices 132 (such as an eye tracking device) as a GATT Server and BLE Peripheral; the signal control unit 120 can be bonded with one host device 130 at a time as a GATT Server and BLE Peripheral; and the signal control unit 120 can be bonded with one receiver and transmitter unit 102 as a GATT Client and BLE Central.

Because the host device role cannot be established until after both BLE bonding and a BLE handshake, the signal control unit 120 will not remove the previous host device 130 bond until after a new host device 130 is fully bonded, and the BLE handshake has been completed.

Since the signal control unit 120 is aware of its bonded devices, the signal control unit 120 includes roles as a central and a peripheral. In the peripheral role (as a BLE peripheral to end devices), the signal control unit 120 functions as an input/output device and allows the user to select between multiple end devices. The signal control unit 120 not only processes the decoded signal but also provides an adaptive output signal to the host device 130 or end device 132. In one implementation, the signal control unit 120 acts as the central to the receiver and transmitter unit 102 and a peripheral for all other connections, including host 130 and end devices 132. When the signal control unit 120 is not connected to the receiver and transmitter unit 102, the signal control unit 120 can scan for the receiver and transmitter unit 102 and attempt to connect and maintain the connection whenever possible. For the other connections, the signal control unit 120 can communicate as being available and connectible, so to enable the peripheral devices to initiate a connection.

Actively maintaining a connection between the signal control unit 120 and a host device 130 allows for the quick transfer of data when needed. The connection between the host device (patient host software (host device) and the signal control unit 120 leverages a first secure wireless protocol/profile that provides Application Level (BLE) security. The host device 130 can connect to multiple services on the signal control unit 120, as described below. These allow bidirectional interaction with the host device for training, configuration, and utilization, as well as more generic HID or HID-like interactions with other apps on the host device and the host device itself. Due to the importance of patient privacy and the unique needs of implanted medical devices, the system consistently uses the first secure wireless protocol/profile to authenticate and encrypt BLE communications within the medical device software system.

Additionally, in a variation of the system, when an intentional neural signal is detected, the signal is converted into a Human Interface Device (standard HID profile) signal. This HID signal is sent to the currently active end device since the signal control unit 120 maintains a list of paired devices. As such, there may be more than one connected device, but only one is actively receiving HID from the signal control unit 120 at a time. The end devices can be paired in the host device (e.g., by a caregiver), but the patient may control which end device is active with neural signals.

Additionally or alternatively, a third "proto-profile" or distinct wireless signal based on a third wireless protocol can use input and output signals communicating with the operating system of the host device (e.g. iOS Switch Control or Assistive Touch) to allow the patient to control the desktop and any apps on the host device or an "end" device instead of the host device based on context data from the host device of the a first secure wireless protocol/profile which provides additional HID-like features and operates as standard BLE in communication between medical and non-medical applications using standard BLE security.

The use of distinct BLE protocols solves the challenge of the different types of security needed for the different types of external host device connections. By utilizing a plurality of distinct wireless profiles (or protocols), the signal control unit 120 is able to communicate adaptively with a plurality of connected devices based on the decoded signal and the connected devices with which the signal control unit 120 is communicating In a variation of the system, the signal control unit 120 will not necessarily maintain a concurrent BLE connection with every bonded device and will have one connection to a receiver and transmitter unit 102, one connection for purpose of providing user interface control via any external device/HID. This connection could be to an any external device, such as an end device or to the host device. The signal control unit 120 does not need to maintain connections to external devices where the signal control unit 120 is not providing UI control.

In additional variations, the signal control unit 120 maintains one connection for proprietary GATT communication when HID control is to an end device rather than a host device. Proprietary host device application communication with administrator services can always enabled whenever the host device is able to connect, even when end device control is in use.

While the signal control unit 120 is providing UI control to the host device, both the HID and proprietary host application communication can optionally take place via the same BLE connection between the SCU and the host device. When the signal control unit 120 is configured for UI control of an End Device, HID application communication can take place over the active end device connection, and no HID communication is conveyed to the host device. A caregiver may still use the host app to send GATT commands to the SCU, as this connection remains intact during end device control. In additional variations, the system signal control unit can operate even though there are no connections established, such as when no applicable devices are bonded or in range of the SCU.

The devices, methods, and systems described herein can benefit or be combined with endovascular carriers and electrode arrays and systems/methods of using neural signals disclosed in U.S. Patent Nos.: U.S. Pat. No. 10,575,783 issued on Mar. 3, 2020; U.S. Pat. No. 10,485,968 issued on Nov. 26, 2019; U.S. Pat. No. 10,729,530 issued on Aug. 4, 2020; and U.S. Pat. No. 10,512,555 issued on Dec. 24, 2019. U.S. Publication Nos.: US20190358445 published on Nov. 28, 2019; US20180303595 published on Oct. 25, 2018; US20200352697 published on Nov. 12, 2020; US20190038438 published on Feb. 7, 2019; US20200078195 published on Mar. 12, 2020; US20190336748 published on Nov. 7, 2019; US20200016396 published on Jan. 16, 2020; US20200363869 published on Nov. 19, 2020. U.S. application Ser. No. 17/093,196 filed on Nov. 9, 2020; and U.S. application Ser. No. 18/792,965 filed on Aug. 2, 2024. PCT Application Nos.: PCT/US2020/060780, PCT/US2020/059509, both filed on Nov. 6, 2020. U.S. Provisional application Nos. 63/003,480 filed on Apr. 1, 2020; 63/057,379 filed on Jul. 28, 2020; and 63/062,633 filed on Aug. 7, 2020. The contents of each of which are incorporated herein by reference in their entirety.

The implanted components 100 and 102 can include amplifiers, filters, controllers, data storage, a power supply, and wireless communication equipment (e.g., RF, Bluetooth, etc.). Moreover, the communication 110 between the receiver and transmitter unit 102 and signal control unit 120 can occur wirelessly via any of the wireless communication modalities discussed herein, including but not limited to Bluetooth, BLE, UHF, RF and/or Wifi. In some variations, communication can occur through a wired connection. Likewise, the communication 1120 between the signal control unit 120 and host device 130 can occur through wired or wireless connections. Moreover, as discussed below, any of these communications modes can occur via a local network or a cloud-based network.

It should be noted that while the signal control unit 120 and host device 130 are illustrated as separate components, variations of the system can include a signal control unit 120 that is integrated into a host unit 130 either by hardware components or through software integration.

Figure 2A:
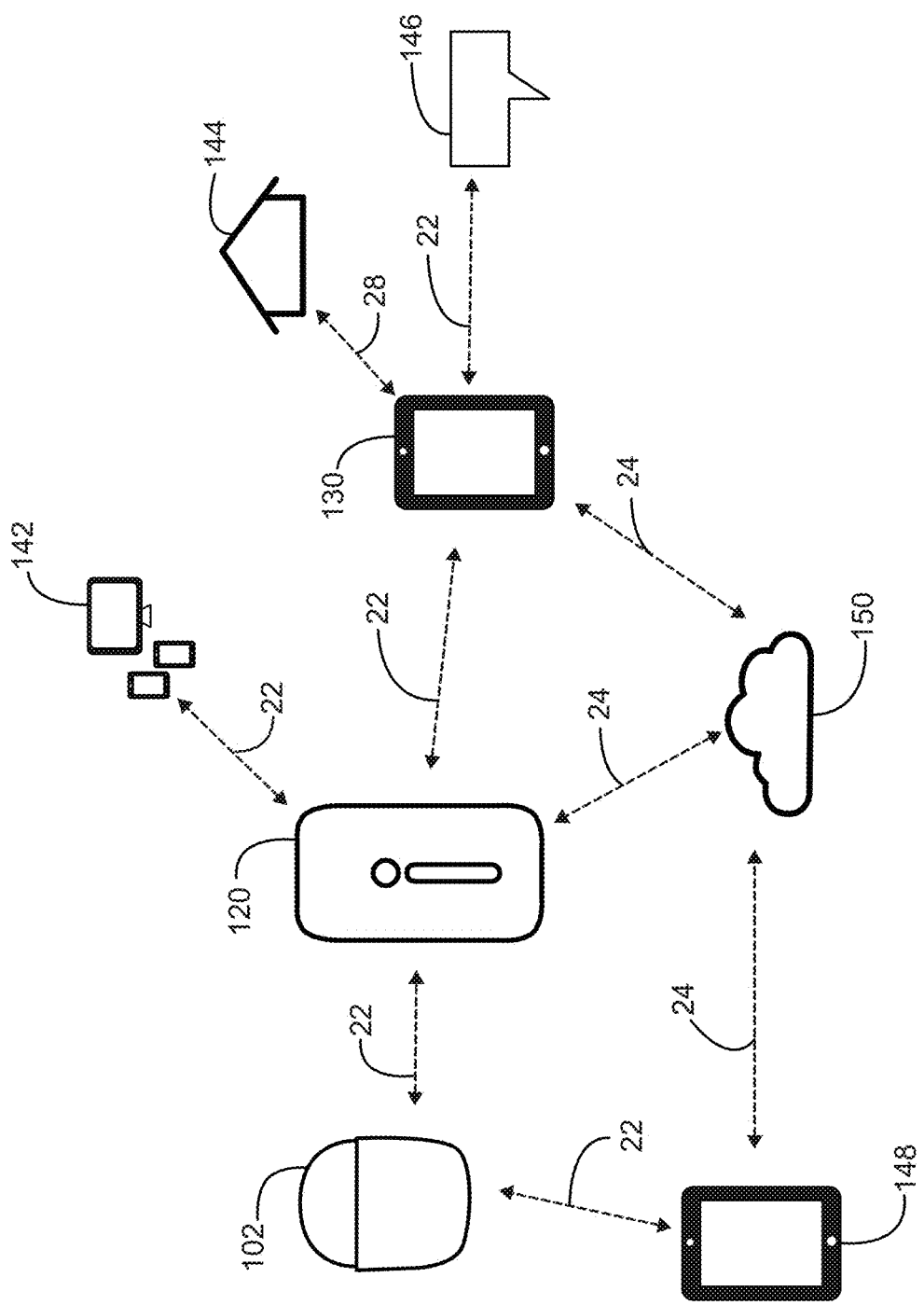
FIG. 2A provides a basic illustration of a signal control unit as being a central hub for communication with various external devices.

FIG. 2A provides a simplified illustration of an interface system using a signal control unit 120 as a central hub for communication with various external devices using different wireless communication modalities 22, 24. As noted above, signal control unit 120 processes one or more decoding algorithms when receiving information from the receiver and transmitter unit 102. This information flow 110 can occur via any wireless communication modality, e.g., BLE. However, other transmission protocols, as well as a wired connection, are within the scope of this disclosure. Alternatively, or in combination, a device 148 can communicate directly with the receiver and transmitter unit 102. In such a case, device 148 can house an integrated signal control unit either through hardware or software. In either case, the signal control unit 120 can access a cloud network or infrastructure 150 through WiFi, cellular, or any other network connection means. The ability to access a cloud environment allows for analysis, meta-analysis, generative client/predictive text, the ability to assist patients remotely, and to provide software downloads remotely. A cloud computing and storage component can also allow for aggregation of data and provide managing physicians and data In addition, any number of host applications/devices (142, 144, 146) can communicate with the signal control unit 120 either through direct connections 112 (e.g., BLE) or via a network 144 to access a cloud network 150. For example, the host applications can include personal digital devices and/or a monitoring service 142, and the host application can include home automation 144, messaging 146 via text or similar communication modes.

Again, the host devices 130, 148 applications can provide a graphical user interface for the users to calibrate and utilize decoding algorithms to control the host device and to provide Bluetooth HID (Human Interface Device) inputs to BT-enabled devices. In addition, remote monitoring 142 can be used to ensure that the patient and BCI are operating as desired. Furthermore, in case of malfunction, the signal control unit 120 can initiate communications with any external device upon the indication that the BCI or receiver and transmitter unit 102 is not functioning properly.

Figure 2B:
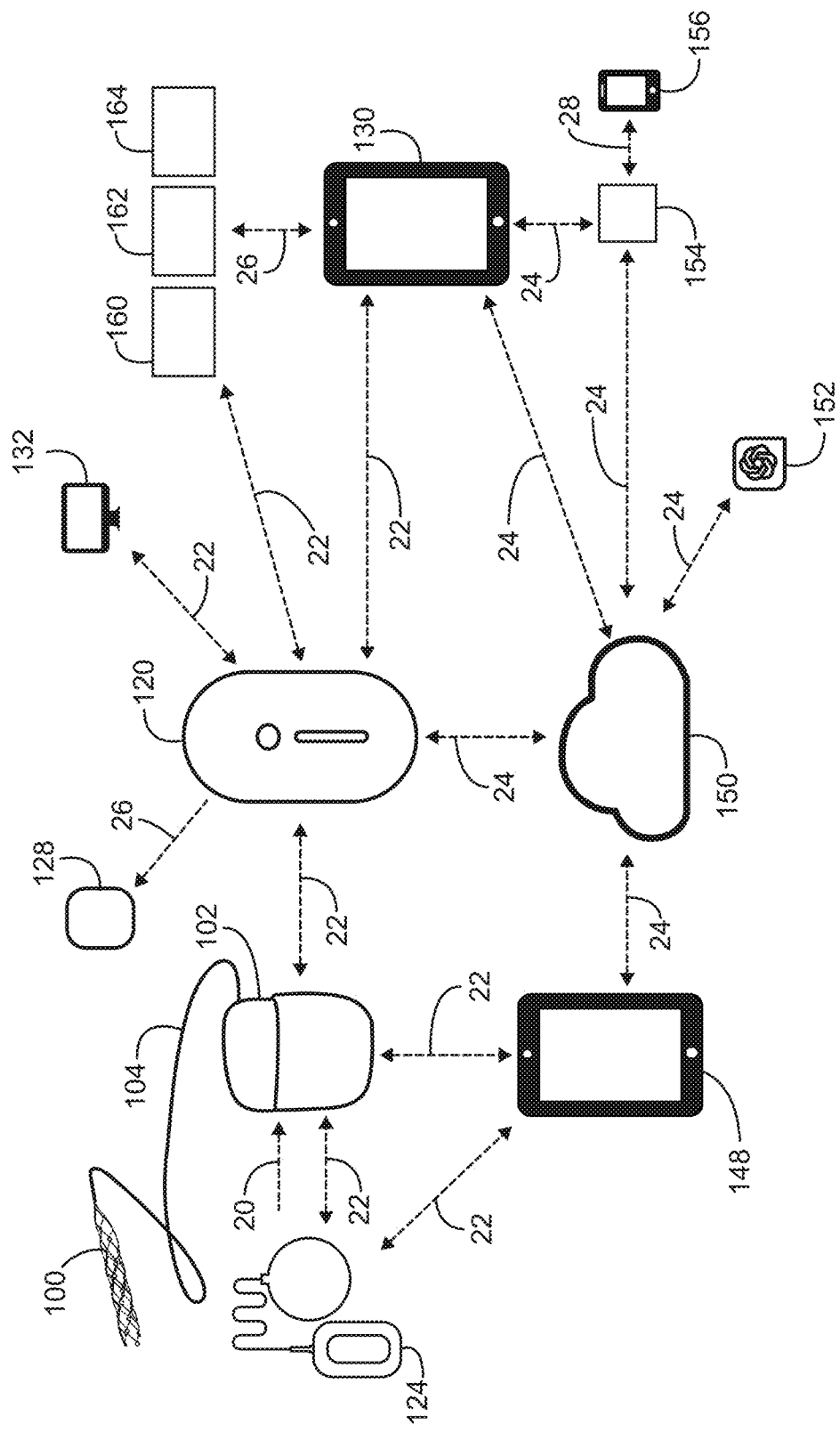
FIG. 2B illustrates an additional variation of an interface system, where the multiple and distinct communication channels of the signal control unit allow an individual BCI user to operatively engage one or more external devices to improve autonomy for the individual.

FIG. 2B illustrates an additional variation of an interface system, where the multiple and distinct communication channels of the signal control unit 120 allow an individual BCI user to operatively engage one or more external devices to improve autonomy for the individual. As noted above, a neural interface device detects a brain signal or neural activity from the individual. The neural interface device includes one or more electrode components 100 that are electrically coupled with a receiver and transmitter unit/component 102. Upon receiving a signal from the electrode component 100, the receiver and transmitter component transmits an electronic signal representative of the brain signal to the signal control unit 120. In one variation, the receiver and transmitter unit 102 transmits the electronic signal representative of the brain signal to the signal control unit 120 using a BLE transmission 22. As noted herein, the use of BLE allows for reduced power demands from the receiver and transmitter unit 102. However, additional variations of the systems and methods disclosed herein can use any wireless transmission modality as discussed herein.

It is noted that FIG. 2B illustrates various specific wireless transmission modalities between the various components (see also FIG. 1B). For example, BLE 22, network/internet/HTTPS 24, UHF 26, short messaging service "SMS" 28. These specific wireless transmission modalities demonstrate one variation of an improved BCI device (100, 104, 102, 120, 130) operating in a much larger system. However, additional configurations of the system contemplate any wireless transmission modality being used between any components of the system.

As discussed above, FIG. 2B illustrates a fully implantable neural interface device that comprises an electrode carrier 100 coupled to a receiver and transmitter unit 102 via one or more wires/leads 104. However, additional variations can include external neural interface devices or partially implanted neural interface devices (i.e., where a portion of the neural interface device extends externally from the body). FIG. 2B also shows an administrator device 148 that can be used for the initial setup of the system or system monitoring. The administrator device can interact with any of the system components using the communication channels independently of the user or in assisting the user.

The variation of the system shown in FIG. 2B includes a signal control unit 120 having a housing structure that is physically separate from the neural interface device (100, 102, 104) and is configured to be portable such that signal control unit 120 can remain with the individual while remaining in operative engagement the system. The signal control unit 120 processes the electronic signal representative of the brain signal using one or more processors that apply one or more algorithms to decode the electronic signal from the transmission component. As noted above, variations of the system include performing all or the majority processing of the electronic signal within the signal control unit 120. However, additional variations can include performing processing of the signal within one or more processors of the receiver and transmitter unit 102. Alternatively, or in combination, some processing can occur through external processing from a host device 130 or via one or more cloud-based networks 150.

Once the system that the electronic signal is representative of an intentional neural brain signal generated by the individual, the signal control unit 120 can transmit an output signal to one or more external devices using the signal control unit. In the illustrated variation, the signal control unit 120 exchanges data via a BLE transmission 22 with a personal host device 130 (such as a tablet computer, a computer, or other electronic device). However, additional variations of the system can include the signal control unit 120 directly communicating with other external electronic devices 160, 162, 164.

In some variations, the signal control unit 120 is configured to work with one or more end devices 132, where an end device is any digital device that supports HID profiles for a keyboard, mouse, or other peripheral devices. Interconnectivity with end devices in the patient's home can leverage traditional pass-key pairing to a BLE HID device with the help of the host device 130. In one example, an end-device can include an eye-tracker or other applications that assist the individual in using the BCI interface.

Variations of the system include a host device 130 that supports secure and proprietary communication with the signal control unit 120 and provides the necessary user interface to support patient training and use of the entire BCI system. Individuals can use their host device to control a wide variety of applications, including but not limited to texting, writing documents, using social media, internet communications, shopping, interaction with home appliances and home automation, health applications, banking applications, etc.

The system shown in FIG. 2B also contemplates that one or more of the external electronic devices 130, 160, 162, 164 generates or passes data ("device data"). This device data is transmitted to the signal control unit 120, which can then transmit the device data back to any of the external electronic devices 130, 160, 162, 164.

FIG. 2B illustrates that the interface system can interact with cloud-based software and data through various communication pathways. In one variation, various host devices 130 can be synchronized with the cloud-based 150 data for a variety of purposes. The cloud network 150 can also store proprietary software relating to system components as well as authentication and certificate services, which are used both during product use and for production, manufacture, and installation of the system. The internet connection 24 (between the signal control unit 120 and cloud 150) can also be used to generate online notifications to a caregiver. In the example shown, the signal control unit 120 can send data to the cloud 150 that ultimately goes to a caregiver's cell phone 156 via SMS 28 messaging. Likewise, the caregiver can communicate with the user's host device 130 via SMS 154 or directly to the signal control unit 120 via the internet connection.

The system network and communication channels allow cloud connectivity for various individuals to monitor and review the performance of the BCI user to provide assistance or to improve the performance of the system. In some variations, the cloud-network 150 stores neural data from the individual (or various other individuals) and can convey requests to third-party services, including support for notification use cases described in more detail elsewhere herein.

The cloud-network 150 also allows the system to access artificial intelligence (AI) that can be transmitted to any component of the system. In the example shown, the AI involves a large language model 152 that assists the BCI user to communicate with others by providing generative content as described in U.S. application Ser. No. 18/734,476 filed on Jun. 5, 2024, the entirety of which is incorporated by reference.

One additional benefit of the interface systems and methods described herein is that the low power, portability, and a number of distinct wireless communication modalities offer an "always-on" functionality. For example, given that the receiver and transmitter unit 102 is charged and the signal control unit 120 and host device 130 are powered, then the individual can use the complete system independently and on-demand for an extended period (e.g., 24 hours or more). This always-on feature allows the individual the ability to engage in digital daily living activities like telehealth, social media, communication, or adjusting interacting with various home interface systems that are based automation or control of appliances (e.g., 160, 162, 164). More importantly, the always-on feature can assist by providing potentially lifesaving messages to caregivers. By having the ability to run the system on battery power for an extended period allows this notification capability to work outside, away from home, and generally without the internet. Without an internet connection the system can still communicate to other devices, either in the individual's home (160, 162, 164) or to devices outside of the home (e.g., 156). The signal control unit 120 can also communicate with devices if the host device 130 is offline. For example, the signal control unit 120 can send signals to one or more alert devices 128 using low power device 433 MHz. The always-on feature also allows the user to transition from an idle state and immediately request caregiver assistance (e.g. if the individual awakes at night and can instantly message a caregiver).

Another benefit of the system described includes selective control between a host 130 and any number of the external devices 160, 162, 164, where the control is adaptive based on detected bonding and/or active connections between the signal control unit 132 device and external devices 160, 162, 164 and based on differentiated intent information (confirmation of the intentional neural brain signal generated by the individual and decoded into an electronic signal transmitted to the SCU). An active connection means that the external device is bonded to the host 130 and active such that the external device is ready to exchange data with the host.

Adaptive control can occur with the host device 120 as well as any number of external devices selected by the user through the use of the signal control unit. The signal control unit 120, through bonding as discussed above, knows which devices are connected, and the signal control unit 120 translates the decoded intent signals generated by the individual adaptively based thereon. The term "bonding" is intended to refer to a relationship established between two devices, allowing for secure reconnection without re-pairing. This can be accomplished by the host device or any device in the system. In some cases, term pairing includes any process where devices exchange the information necessary to establish a connection or an encrypted connection.

As the signal control unit 120 translates the decoded signal into one or more output signals, the signal control unit 120 can use information on the number of bonded devices to take into account how to relay the output signal. This allows the BCI user an individual autonomous control of interactions with a variety of different external devices without dependence on a caregiver. As one example, as noted above, if the individual generates an intent to contact a caregiver, once this intent is sent to the signal control unit for decoding and confirmation, the signal control unit 120 can generate an output command based on the bonded devices available. If the BCI user is in a situation where there are no bonded devices or if there is no network connectivity, then the signal control unit 120 can transmit the output through a fallback communication protocol (e.g., 433 MHz to an alert device 128). This capability can also be applied to system warnings.

In one variation, the BCI system can be configured to monitor the ability of the system to detect a brain signal from the user and determine that the electronic signal associated is representative of an intentional neural brain signal generated by the individual. In some cases, an individual might suffer from deteriorating health such that the signals generated by the brain change or deteriorate, causing a BCI system that once was properly functioning no longer function due to the deteriorating condition of the individual. In such a case, the signal control unit 120 can be configured to provide notice to a caregiver or other medical practitioner.

In an additional variation of the system shown in FIG. 2B the signal control unit 120 receives an electronic signal from the receiver and transmitter unit 102 and produces a decoded output signal. The signal control unit 120 is aware of which external devices are connected and active. Based on this information, the signal control unit 120 can produce an output signal for an HID. This HID output signal can be sent to the currently active end device. In one variation of the system, the signal control unit 120 more than external device can be connected to the signal control unit 120 but the signal control unit 120 is configured to only send the output signal to one device at a time. While the end devices can be paired in the host device 130 (e.g., by a caregiver), the user can control which device is active using neural signals. Additionally, during the active HID session with the end device, another active session with the host device can be ongoing using a distinct wireless protocol, which allows for secure input/output to/from the signal control unit 120 to the host device that informs the configuration and control of the signal control unit 120. Additionally or alternatively, a third "proto-profile" or distinct wireless signal based on a third wireless protocol may utilize input and output signals communicating with the operating system of the host device (e.g., iOS Switch Control or Assistive Touch) to allow the patient to control the desktop and any apps on the host device or an "end" device instead of the host device based on context data from the host device. By utilizing a plurality of distinct wireless profiles (protocols or modes), the signal control unit 120 can communicate adaptively with a plurality of connected devices based on the decoded signal and the connected devices with which the signal control unit 120 is communicating.

Figure 3A:
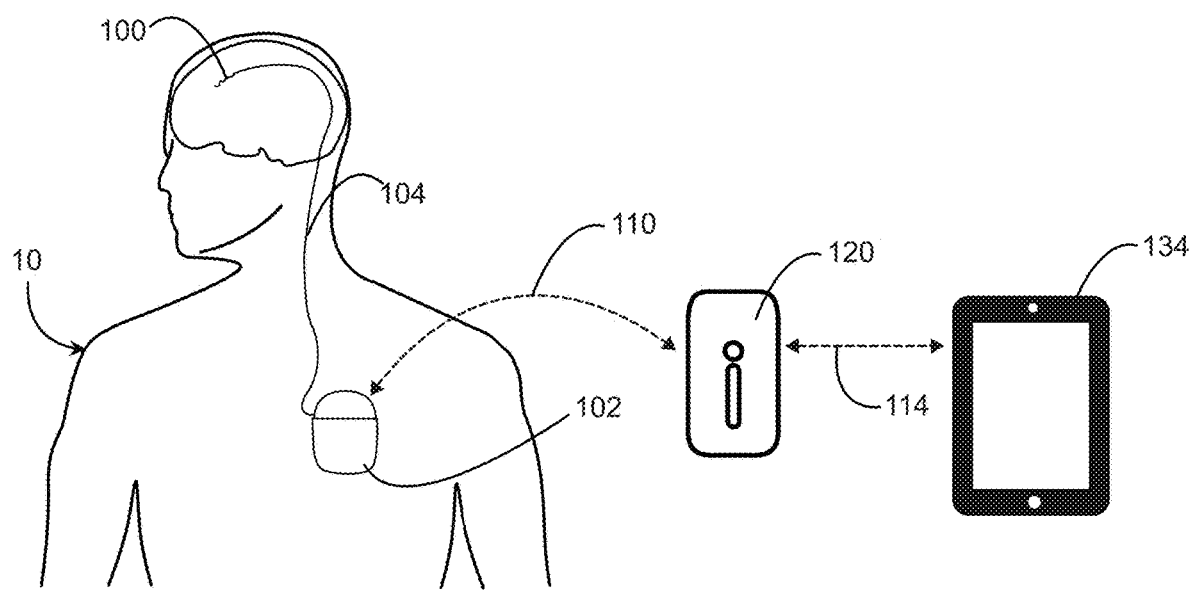
FIGS. 3A and 3B illustrate examples where the BCI system is mapped to standard communication protocols of various consumer electronics.
Figure 3B:
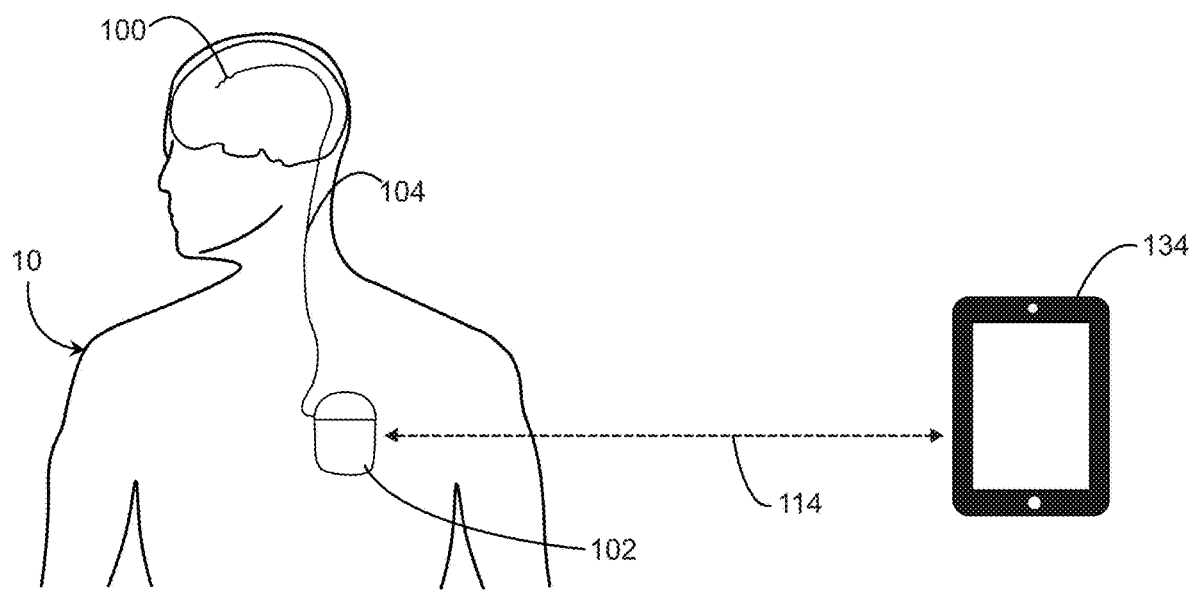

In some variations of the system, a connection between a signal control unit 120 and a host device 130 is immediately disconnected after data transfer and when data is not being transferred between the signal control unit 120 and host device 130 to preserve power. However, this can increase the latency of the system. In order to improve the user experience for the systems described in this disclosure, e.g., as shown in FIGS. 3A and 3B, the components of the system can be configured to minimize system latency for the user to use brain activity to engage with host/external devices. For example, both the host and end devices can keep their connections active when the signal control unit 120 is in use. This can allow a low system latency (e.g., less than 100 ms) from detection of implanted neural signal, transmission and wireless receipt of the signal by the signal control unit 120, decoding and translation of neural signal to an output signal using the signal control unit 120, and transmission of a second wireless transmission from the signal control unit 120 to one or more external devices. The selective control between host and end devices can be adaptive based on detected bonds (between the signal control unit 120 and external devices) and differentiated intent information (decoded signals from the neural signals received from the electrode device and decoded by the signal control unit 120 device).

FIGS. 3A and 3B illustrate another variation of a BCI interface that allows for frictionless interaction between the BCI units 100, 102, 104 and consumer electronics having standard and customized user interfaces that can be controlled via standardized communication protocols. In this variation, consumer electronics can include an end device and/or any human interface device (HID) 134 such as a smartphone, tablet, computer, etc. The purpose of the improved BCI system is to increase the usability of the BCI system for a wider group of users with varying levels of BCI control. FIG. 3B shows a variation where end device/HID functions as the receiver and transmitter unit described above through an application on the device 134.

The degree to which a person can control a BCI to generate a control signal varies among individuals. For example, some individuals can generate complex control signals that can be used to perform complex tasks, such as high degrees-of-freedom (DoF) control of a robotic arm in 3-dimensional (3D) space and direct brain-to-speech generation, while other individuals can only generate a simple control signal, such as a binary output.

The variability is also found in non-BCI control signals. For example, some individuals can use traditional methods to interact with human interface devices normally, but other individuals having significant motor impairments can only generate low levels of control signals using their bodies to interact with the digital devices. Many consumer electronics, such as laptops, mobile phones, televisions, have built-in control systems that provide a wide range of users with varying levels of control of the device. For example, Switch Control or Assistive Touch is built-in interaction method implementation from Apple for iOS and iPad OS to cater for users with limited mobility to gain full control of the devices. Importantly, these interaction methods can be controlled using a standardized protocol, such as universal serial bus (USB) HID. Typically, the interaction occurs using a keyboard and a mouse—or devices that mimic the outputs of a keyboard and mouse.

Ordinarily, in the case of a BCI user, the system requires custom software to cater for the wide range of users to create interaction methods that can be used to perform useful tasks, meaning that the tasks that can be performed are limited to what that custom software can do. Often, custom software function is limited compared to what the originating company can do (i.e., a 3rd party app has less function on an Apple device compared to an app that Apple themselves makes). The systems described herein overcome conventional challenges by providing a BCI system that translates any control signal from BCI to standardized communication protocols already used to control existing consumer products or HID. Such a system increases the breadth of users and devices that can interface with the BCI system.

FIGS. 3A and 3B are representative illustrations of improved BCI systems that allow an individual 10 to communicate with common consumer devices 134. For purposes of illustration, the consumer device 134 is shown as a tablet. However, any consumer device is within the scope of this disclosure. In FIG. 3A, the BCI can include an internal unit 102 that is coupled to one or more units that detect neural signals from the individual. The unit can correspond with a signal control unit 120 that can be coupled or paired with the consumer device 134. The unit 120 can generate commands 114 that are specific to the device 134. For example, the command 114 can allow the unit 120 to control a cursor or prompt on the device 134 such that the individual 10 can control the device 134 using the controls inherent to the device. Coupling to the control unit 120 and the device 134 can occur via a wired connection or wireless connection using any number of communication protocols.

FIG. 3B illustrates another variation of the BCI system where the implanted unit 102 is configured to couple directly to the consumer device 134.

The systems and methods described herein allow for multiple configurations to enable a BCI user to have increased autonomy and interaction with his/her environment. As one example, in the case where the BCI user has limited motor ability and requires a caregiver, the systems described herein can allow the BCI to sleep at night and also allows the caregiver to go to bed. While the BCI user is sleeping, a signal control unit can enter an "idle" or "locked" mode by monitoring the BCI user, monitoring the environment, or by a control button on the signal control unit. This idle/locked mode can be a low energy consumption state. If at some point during the night the BCI user awakes, user has the ability to trigger the signal control unit to wake up any host device (e.g., via the proprietary/secure/encrypted BLE output signal) to engage applications on the host device. The host device BCI app can display an option to notify a caregiver or use the system (perform instrumental activities of daily living "IADLS"). The individual can choose to use the system to launch a website (via DMO based on decoded signal of neural data recorded from patient intent), allowing the patient to scroll through a feed (using HID) or other internet-based content. If there is loss of an internet connection or other loss of connectivity to the signal control unit, the system can notify the caregiver or other individual by either generating an audible tone/series of tones using the signal control unit's internal speaker and/or generate an alert signal using 433 MHz to any configured receiver, to a chime or doorbell type device. This alert signal can be initiated through the system and/or could also be initiated by the individual's neural signal. This can alert a caregiver or other individual that the user requires assistance. If there are no conditions where the BCI user requires assistance, the system allows the user to fall back asleep, causing the signal control unit to transition back to idle mode. Later, the BCI user could awaken again and then decide to watch a TV that is configured as another external device (either directly or through the host device). The BCI user is able, via HID control, to turn on and select media content to watch without waking the caregiver. Finally, the patient can decide to send a message to the caregiver via the host device, to thank them for their assistance and let them know they are going to sleep.

Additional variations of the BCI systems can be configured to allow BCI users to directly trigger common gesture commands associated with various electronic devices such as an Apple Vision Pro, Meta Quest, Ray-Ban Meta smart glasses, or other similar devices.

For example, spatial computing devices using gesture control using a camera or other wearable hand control, as well as voice and button controls have limitations with accuracy and precision in interpreting user gestures, leading to unintentional actions. The present systems can suffer latency delays between gesture input and system response. The gestures may not be recognized properly in various lighting conditions or if the background is too cluttered. Extended use of gesture controls in current systems can lead to physical fatigue, especially with complex or repetitive gestures. There is also a learning curve associated with such devices where users may find it challenging to learn and remember the various gestures required for different commands. There is also a limited range of gestures available as well as the need to prevent hands or objects blocking the sensors can prevent proper gesture recognition and the need for consistency in producing the gestures, which can vary across different users or even for the same user over time. Other problems include accessibility challenges for users with physical disabilities, privacy issues with continuous monitoring of gestures, maintenance and calibration of the system. In variations of the methods and systems described herein, the signal control unit is configured to detect whether an external device having gesture control is connected thereto, and alter an output signal to trigger one or more of the gesture controls of the external device.

The BCIs of the present system can address these issues by offering a significant number of one-dimensional (1D) continuous DMO signals. Each DMO signal can be matched to a gesture command of the systems described above. Configuring DMOs of an individual to directly produce the gesture command can allow the BCI user to have superior control of a spatial computing device without many of the drawbacks currently associated with gesture control on special computing devices.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings, such as the terms "including", "having," and their derivatives. Also, the terms "part," "section," "portion," "member," "element," or "component" when used in the singular, can have the dual meaning of a single part or a plurality of parts. As used herein, the following directional terms "forward, rearward, above, downward, vertical, horizontal, below, transverse, laterally, and vertically" as well as any other similar directional terms, refer to those positions of a device or piece of equipment or those directions of the device or piece of equipment being translated or moved. Finally, terms of degree such as "substantially", "about," and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth but is intended to cover alternatives, modifications, and equivalents of the variations or embodiments described herein. Further, the scope of the disclosure fully encompasses other variations or embodiments that may become obvious to those skilled in the art in view of this disclosure.

The invention claimed is:

1. An interface system for use by an individual, the interface system comprising:
   a neural interface device having an electrode component electrically coupled with a transmitter/receiver component, where the electrode component is configured to detect a brain signal from a brain of the individual and the transmitter/receiver component is configured to transmit an electronic signal representative of the brain signal;
   a signal control unit comprising a housing structure that is physically separate from the neural interface device and is configured to be portable;
   a power supply, an electronic communications circuitry and a processor each housed with the housing structure;
   wherein the processor is configured to apply one or more algorithms to decode the electronic signal from the transmitter/receiver component and is also configured to produce an output signal upon determining that the electronic signal is representative of an intentional neural brain signal generated by the individual; and
   wherein the electronic communications circuitry is configured to provide a plurality of wireless electronic communication modalities for electronic transfer communication of the output signal to a plurality of external devices, wherein at least two wireless electronic communication modalities are different and wherein the electronic communications circuitry is also configured for electronic exchange of a device data with one or more of the plurality of external devices, where the device data is generated by at least one of the plurality of external devices.

2. The interface system of claim 1, wherein at least one of the plurality of wireless electronic communication modalities comprises a security communication modality and where only a subset of the plurality of external devices include the security communication modality.

3. The interface system of claim 2, wherein the transmitter/receiver component of the neural interface device and the signal control unit are configured to use the security communication modality to communicate the electronic signal representative of the brain signal.

4. The interface system of claim 2, wherein subset of the plurality of external devices includes a host device and/or an administrator device.

5. The interface system of claim 4, wherein the signal control unit is configured for wirelessly coupling to a host device having one or more applications that control at least one of the plurality of external devices.

6. The interface system of claim 5, wherein the signal control unit is configured to directly wirelessly exchange data with the host device.

7. The interface system of claim 1, wherein the signal control unit is configured to communicate the output signal with one of the plurality of external devices at a time.

8. The interface system of claim 1, wherein the neural interface device is coupled to the transmitter/receiver component through one or more lead members.

9. The interface system of claim 8, wherein the neural interface device, the one or more lead members, and the transmitter/receiver component are configured for full implantation within the individual.

10. The interface system of claim 1, wherein the transmitter/receiver component is configured for wireless charging of a power supply in the transmitter/receiver component and independently of the signal control unit using a remote charging device.

11. The interface system of claim 10, wherein the transmitter/receiver component and the remote charging device are configured to maintain a wireless communication connection therebetween.

12. The interface system of claim 1, wherein the signal control unit further includes one or more speakers.

13. The interface system of claim 1, wherein the signal control unit is configured electronically connect with one or more of the plurality of external devices.

14. The interface system of claim 13, wherein the signal control unit is further configured to detect whether the one or more of the plurality of external devices and to alter the output signal based on whether the one or more of the plurality of external devices is electrically connected to the signal control unit.

15. The interface system of claim 13, wherein the signal control unit is configured to transmit the output signal as a wireless signal to an alert device when the plurality of external devices are unconnected to the signal control unit.

16. The interface system of claim 1, wherein the signal control unit comprises a user interface accessible on a surface of the housing structure, where the user interface comprises a plurality of visible indicators.

17. The interface system of claim 1, wherein the signal control unit is configured to determine whether at least one of the plurality of external devices uses a gesture control, and wherein the signal control unit adjust the output signal to trigger the gesture control.

18. An interface system for directing communication between an individual and a plurality of external devices, where the individual has a neural interface device having an electrode component electrically coupled with a transmitter/receiver component, where the electrode component is configured to detect a brain signal from a brain of the individual and the transmitter/receiver component is configured to transmit an electronic signal representative of the brain signal, the interface system comprising:
  a signal control unit comprising a housing structure that is physically separate from the neural interface device and is configured to be portable;
  a power supply, an electronic communications circuitry and a processor each housed with the housing structure;
  wherein the processor is configured to apply one or more algorithms to decode the electronic signal from the transmitter/receiver component and is also configured to produce an output signal upon determining that the electronic signal is representative of an intentional neural brain signal generated by the individual; and
  wherein the electronic communications circuitry is configured to provide a plurality of wireless electronic communication modalities for electronic transfer communication of the output signal to a plurality of external devices, wherein at least two wireless electronic communication modalities are different and wherein the electronic communications circuitry is also configured for electronic exchange of a device data with one or more of the plurality of external devices, where the device data is generated by at least one of the plurality of external devices.

19. A method of operatively interfacing an individual with a plurality of external devices, the method comprising:
  detecting a brain signal from the individual using a neural interface device having an electrode component electrically coupled with a transmitter/receiver component;
  transmitting an electronic signal representative of the brain signal using the transmitter/receiver component to a signal control unit comprising a housing structure that is physically separate from the neural interface device and is configured to be portable;
  processing the electronic signal representative of the brain signal using a processor within the signal control unit that is configured to apply one or more algorithms to decode the electronic signal from the transmitter/receiver component;
  producing an output signal upon determining that the electronic signal is representative of an intentional neural brain signal generated by the individual;
  transmitting the output signal to one or more external devices using the signal control unit; and
  electronically exchanging a device data with one or more of the plurality of external devices using the signal control unit, where the device data is generated by at least one of the plurality of external devices, where the signal control unit is configured to select a plurality of separate communication modalities based on which of the plurality of external devices is connected to the signal control unit.

20. The method of claim 19 further comprising electronically exchanging the device data with one or more of the plurality of external devices using the signal control unit, where the device data is generated by at least one of the plurality of external devices.

21. The method of claim 19, wherein at least one of the plurality of wireless electronic communication modalities comprises a security communication modality and where only a subset of the plurality of external devices include the security communication modality.

22. The method of claim 19, wherein the transmitter/receiver component of the neural interface device and the signal control unit are configured to use the security communication modality to communicate the electronic signal representative of the brain signal.

23. The method of claim 19, wherein transmitting the output signal to one or more external devices using the signal control unit comprises transmitting limiting transmitting the output signal to one of one or more external devices at a time.

24. The method of claim 19 further comprising wirelessly charging a power supply in the transmitter/receiver component and independently of the signal control unit using a remote charging device.

25. The method of claim 19 maintaining a wireless communication connection between the transmitter/receiver component and the remote charging device.

26. The method of claim 19, where the signal control unit is configured to electrically disconnect one or more of the plurality of separate communication modalities to preserve a power level of the signal control unit.

* * * * *